United States Patent [19]
Cushman

[11] Patent Number: 5,706,249
[45] Date of Patent: Jan. 6, 1998

[54] PANEL SPACER WITH ACOUSTIC AND VIBRATION DAMPING

[76] Inventor: William B. Cushman, 1315 Finley Dr., Pensacola, Fla. 32514

[21] Appl. No.: 626,053

[22] Filed: Apr. 1, 1996

[51] Int. Cl.$^6$ ............................................. G10K 11/16
[52] U.S. Cl. ...................................... 367/1; 181/284
[58] Field of Search ............................. 367/1; 181/284, 181/290, 291, 292, 293, 294; 252/62

[56] References Cited

U.S. PATENT DOCUMENTS

| | | | |
|---|---|---|---|
| 3,834,487 | 9/1974 | Hale | 181/292 |
| 5,400,296 | 3/1995 | Cushman et al. | 367/1 |
| 5,526,324 | 6/1996 | Cushman | 367/1 |

OTHER PUBLICATIONS

Hartmann & Jarzynski, "Ultrasonic Hysteresis Absorption in Polymers" J. Appl. Phy. vol. 43 No. 11, Nov. 1972 pp. 4304–4312.

Meyer & Neumann "*Physical &Applied Acoustics an Introduction*" Academic Press, New York, 1972 p. 37.

*Primary Examiner*—Daniel T. Pihulic

[57] ABSTRACT

A panel spacer is disclosed that enhances the natural damping characteristics of the material used for construction. The spacer is shaped to redirect acoustic and vibrational energy into a direction parallel to the panel surfaces and to take advantage of the faster energy propagating through the material of the spacer relative to surrounding gasses. Energy propagating through the spacer will arrive at a mid-point of the spacer well before sound originating from the same source can reach the same point through air or another gas. The phase discrepancy between the induced displacements of the spacer and the surrounding gas is used to dissipate energy by causing the spacer to interacting viscously with the gas.

9 Claims, 1 Drawing Sheet

PANEL SPACER WITH ACOUSTIC AND VIBRATION DAMPING

BACKGROUND OF THE INVENTION

1. Field of the Invention

This invention relates to acoustic and vibration damping devices, and more particularly, to acoustic and vibration damping devices that may be used as spacers between two or more panels.

2. Description of Related Art

Spacing two or more panels a distance apart from each other may enhance the acoustic and vibrational blocking effect of the panels. Multiple panel surfaces take advantage of the reflective effect of the characteristic acoustic impedance mismatches where each surface forms a boundary with a second propagation medium. Simply placing a spacer made from a distinctly different material between two panels is effective when the different material has a different characteristic acoustic impedance. For example, two metal panels can be separated with an elastomeric material and the resultant structure will have four surfaces that reflect acoustic and vibrational energy. If the structure is in air, there will be an air to metal boundary, a metal to elastomer boundary, an elastomer to metal boundary, and a metal to air boundary. If the characteristic acoustic impedance, Z, is known for each material the reflection factor may be calculated for each boundary. The appropriate formula may be found in Erwin Meyer and Ernst-Georg Neumann's text *Physical and Applied Acoustics, an Introduction*, Academic Press, 1972, Section 1.4, transmission line theory. The impedances of steel and air are used to illustrate.

$$\text{Reflection Factor} = \frac{Z_{Air} - Z_{Steel}}{Z_{Air} + Z_{Steel}} = -0.999982$$

The reflection factor at the elastomer/steel boundaries is much less than between air and steel because the characteristic acoustic impedance of the elastomer is much closer to the characteristic acoustic impedance of steel than to air.

Multiple free-standing panels with air between will block acoustic and vibrational energy well. Multiple free-standing panels with vacuum between are an ideal block to acoustic and vibrational energy. However, in most practical applications multiple panels may not be free standing but must be supported by some solid or semi-solid structure. If the loading placed upon this support structure is high, the support structure must be correspondingly stiff and will act as an acoustic and vibrational "short circuit" from one panel to the other.

Careful choice of the material used to make spacers between acoustic and vibration blocking panels can greatly improve the performance of the overall structure. For example, the choice of spacer material can be made taking into consideration the characteristic acoustic impedance of the spacer material relative to the panel material as well as its mechanical properties. Furthermore, Cushman, et al. (U.S. Pat. No. 5,400,296) teach the use of two or more species of impedance miss-matched particles distributed within the spacer material to promote phase-canceling reflections within that material; and Cushman (U.S. patent application Ser. No. 08/515,580) teaches the use of piezo-electric materials with embedded shorting particles to dissipate acoustic and vibrational energy as heat. In all cases, for acoustic and vibrational energy to be dissipated it must be converted into some other form such as heat.

The Kinetic Molecular Theory of Heat holds that molecular interactions must be perfectly elastic or the system and, by definition, the temperature, will run down to absolute zero molecular movement. Perfectly elastic molecular interactions make the problem of dissipating acoustic and vibrational energy very difficult because acoustic and vibrational energy is also manifested as molecular displacements. The mean vector direction of the molecular displacement of thermal energy always sums to zero at a particular locale. Acoustic or vibrational energy may be distinguished from thermal energy by the fact that the mean vector direction of the molecular displacement of propagating acoustic or vibrational energy is cyclically non-zero at a particular locale. If the amplitude of molecular displacement at a particular locale is sufficiently high then hysteresis effects within the medium can occur that tend to re-direct propagation vector directions randomly and to convert propagating acoustic or vibrational energy into heat. Internal hysteresis is thought to be caused by metastable molecular energy levels within a material and is material specific. Propagating acoustic or vibrational energy may boost a particular molecule into a higher energy level, thus subtracting that energy from propagating energy, where the molecule remains for some time before randomly returning to its original energy level. For a discussion of this effect see Hartmann and Jarzynski, "*Ultrasonic hysteresis absorption in polymers*," J. Appl. Phys., Vol. 43, No. 11, November 1972, 4304–4312.

The choice of materials to use as spacers between multiple acoustic and vibrational energy blocking panels is complemented by the choice of the shape of these spacers. A sheet of elastomeric material between panels is a poor approach to this problem, albeit an easily implemented one. The reason is that in sheet form the spacer itself can do little to block the passage of acoustic and vibrational energy. Beneficial acoustical effects are limited to reflections that occur at the boundaries between the spacer material and the panels and to material effects. Some performance improvement will be realized when the material is well chosen to promote hysteresis effects or to utilize the teachings of Cushman, et al. or Cushman. However, a simple sheet of material distributes propagating energy widely and minimizes the beneficial effects that may be obtained from hysteresis effects, or localized phase cancellation, or piezo-electric conversion of the energy because low molecular displacement amplitudes are maintained within the material.

SUMMARY OF THE INVENTION

Accordingly, the object of the instant invention is to provide an improved panel spacer that effectively amplifies the magnitude of molecular displacements within the material of the spacer and with acoustic and vibration damping inherent in the physical shape of the spacer.

This and additional objects of the invention are accomplished by shaping the spacer so that acoustic and vibrational energy is concentrated at particular locales, thereby increasing molecular displacement amplitudes and pressures at those locales proportionately and enhancing material effects such as hysteresis and piezoelectric dissipation within the material used. Furthermore, the spacer is shaped to promote viscous damping in webbing or extended structures of the instant invention and to promote propagating energy redirection along and within webbing or extended structures of the instant invention.

BRIEF DESCRIPTION OF THE DRAWINGS

In the following Description of the Preferred Embodiments and the accompanying drawings, like numerals in different figures represent the same structures or elements.

The representation in each of the figures is diagrammatic and no attempt is made to indicate actual scales or precise ratios. Proportional relationships are shown as approximations.

DESCRIPTION OF THE PREFERRED EMBODIMENTS

The parts indicated on the drawings by numerals are identified below to aid in the reader's understanding of the present invention.

10. Upper Panel Section.
20. Lower Panel Section.
30. Nub Spacers.
40. Filament Webbing.
50. Sheet Webbing.
60. Viscous Damping Holes.
70. Extended Areas.

Figure 1:
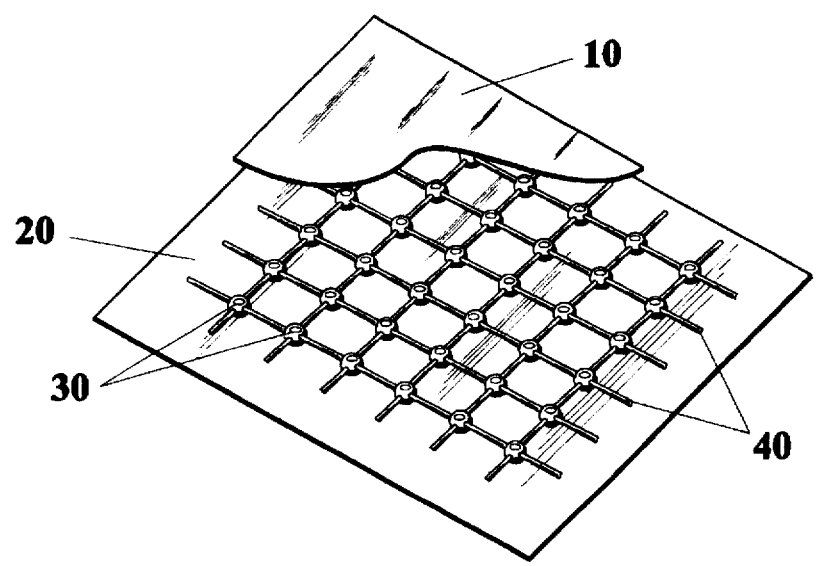
FIG. 1 shows an embodiment of the instant invention incorporating Nub Spacers and Filament Webbing.

FIG. 1 shows an embodiment of the instant invention with Nub Spacers and Filament Webbing. In FIG. 1, Nub Spacers, 30, are substantially held in place between Upper Panel Section, 10, and Lower Panel Section, 20, by Filament Webbing, 40. Nub Spacers, 30, serve to maintain a space between Upper Panel Section, 10, and Lower Panel Section, 20, and to transmit loading between panels. Nub Spacers, 30, also serve to suspend Filament Webbing, 40, between Upper Panel Section, 10, and Lower Panel Section, 20. As a first approximation, propagating acoustic or vibrational energy presents to Nub Spacers, 30, as pressure variations that are multiplied in force magnitude by the ratio of the cross-sectional area of the Nub Spacers to the cross-sectional area of the panels. For example, if the Upper Panel Section, 10, and the Lower Panel Section, 20, each have a cross-sectional area of one square centimeter for each Nub Spacer, and the contact areas of each Nub Spacer is one square millimeter against each panel, then the ratio of the areas is 100:1. In this case, the amplitude of the force per square centimeter applied by propagating acoustic or vibrational energy to a panel will be multiplied by a factor of 100 at the Nub Spacer because there is $1/100^{th}$ the area to support it.

Increased pressure acting on the Nub Spacers will cause them to deform to a proportionally greater extent. The predominant modality of propagation across the Nub Spacers will be in compression/tension. If the Nub Spacers are one millimeter from top to bottom and made from a common polymer such as Nylon, then the propagation delay through the Nub Spacers can be calculated. The speed of sound in Nylon 6,6 is roughly 2620 meters per second. The propagation delay through one millimeter is 382 nanoseconds. This short time period represents a negligible phase delay for all audible frequencies. The Nub Spacers are, therefore, effectively subjected to a uniform pressure throughout their length, from top to bottom, and will react to this stress by bulging or contracting radially in a direction perpendicular to the propagating direction of the acoustic or vibrational energy. In FIG. 1 Nub Spacers, 30, will re-direct some portion of the acoustic and vibrational energy propagating through them from Upper Panel Section 10, to Lower Panel Section, 20, into Filament Webbing, 40 by radial expansion and contraction. Once acoustic or vibrational energy is propagated onto Filament Webbing, 40, it is unlikely to be redirected by Nub Spacers, 30, to either Upper Panel Section 10, or Lower Panel Section, 20, because the same compression/contraction mechanisms are only partially effective in the reverse direction. Furthermore, increasing the propagation distance by redirecting it to the Filament Webbing, 40, increases the probability of effective dissipation as heat by the mechanisms discussed above, that is, by hysteresis effects, or enhanced phase cancellations, or by piezoelectric conversion into heat with conductive particles.

Viscous Damping may be exploited in addition to the mechanism of energy redirection discussed above. The propagation velocity of sound in most materials is much faster than the propagation velocity of sound in air of about 334 meters per second. In the structure shown in FIG. 1, the Filament Webbing, 40, will be displaced by propagating acoustic energy much earlier than the surrounding air which is also propagating acoustic or vibrational energy from the same source, either the Upper or Lower Panel, 10 or 20, in FIG. 1. This phase difference in the propagation times of the structure of the spacer and the surrounding air forces the structure and the air to displace relative to each other. This relative displacement will cause viscous damping as the air between Upper or Lower Panels, 10 and 20, is forced past the Nub Spacers, 30, and the Filament Webbing, 40, of FIG. 1. Viscous damping converts displacement energy into heat.

Figure 2:
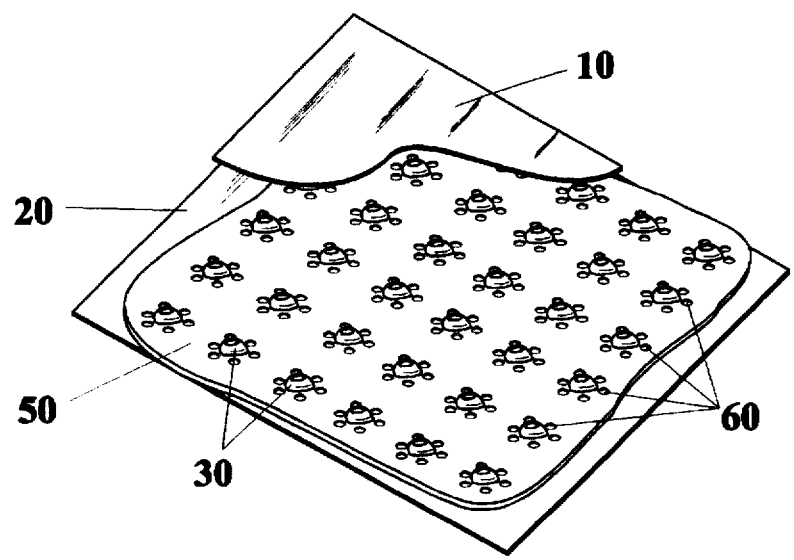
FIG. 2 shows the preferred embodiment of the instant invention incorporating Nub Spacers and Sheet Webbing with Viscous Damping Holes.

FIG. 2 shows the preferred embodiment of the instant invention incorporating Nub Spacers and Sheet Webbing with Viscous Damping Holes. In FIG. 2, Nub Spacers, 30, are substantially held in place between Upper Panel Section, 10, and Lower Panel Section, 20, by Sheet Webbing, 50. Nub Spacers, 30, serve to maintain a space between Upper Panel Section, 10, and Lower Panel Section, 20, and to transmit loading between panels. Nub Spacers, 30, also serve to suspend Sheet Webbing, 50, between Upper Panel Section, 10, and Lower Panel Section, 20. As a first approximation, propagating acoustic or vibrational energy presents to Nub Spacers, 30, as pressure variations that are multiplied in force magnitude by the ratio of the cross-sectional area of the Nub Spacers to the cross-sectional area of the panels. For example, if the Upper Panel Section, 10, and the Lower Panel Section, 20, each have a cross-sectional area of one square centimeter for each Nub Spacer, and the contact areas of each Nub Spacer is one square millimeter against each panel, then the ratio of the areas is 100:1. In this case, the amplitude of the force per square centimeter applied by propagating acoustic or vibrational energy to a panel will be multiplied by a factor of 100 at the Nub Spacer because there is $1/100^{th}$ the area to support it.

Increased pressure at the Nub Spacers will cause them to deform to a proportionally greater extent. The predominant modality of propagation across the Nub Spacers will be in compression/tension. If the Nub Spacers are one millimeter from top to bottom and made from a common polymer such as Nylon, then the propagation delay through the Nub Spacers can be calculated. The speed of sound in Nylon 6,6 is roughly 2620 meters per second. The propagation delay through one millimeter is 382 nanoseconds. This short time period represents a negligible phase delay for all audible frequencies. The Nub Spacers are, therefore, effectively subjected to a uniform pressure throughout their length, from top to bottom, and will react to this stress by bulging or contracting radially in a direction perpendicular to the propagating direction of the acoustic or vibrational energy.

In FIG. 2 Nub Spacers, 30, will re-direct some portion of the acoustic and vibrational energy propagating through them from Upper Panel Section 10, to Lower Panel Section, 20, into Sheet Webbing, 50 by radial expansion and contraction. Once acoustic or vibrational energy is propagated onto Sheet Webbing, 50, it is unlikely to be redirected by Nub Spacers, 30, to either Upper Panel Section 10, or Lower Panel Section, 20, because the same compression/contraction mechanisms are only partially effective in the reverse direction. Furthermore, increasing the propagation distance by redirecting it to the Sheet Webbing, 50, increases the probability of effective dissipation as heat by the mechanisms discussed above; that is, by hysteresis effects, or enhanced phase cancellations, or by piezoelectric conversion into heat with conductive particles.

Viscous Damping may be exploited in addition to the mechanism of energy redirection discussed above. The propagation velocity of sound in most materials is much faster than the propagation velocity of sound in air of about 334 meters per second. In the structure shown in FIG. 2, the Sheet Webbing, 50, will be displaced by propagating acoustic energy much earlier than the surrounding air which is also propagating acoustic or vibrational energy from the same source, either the Upper or Lower Panel, 10 or 20, in FIG. 2. This phase difference in the propagation times of the structure of the spacer and the surrounding air forces the structure and the air to displace relative to each other. This relative displacement will cause viscous damping as the air between Upper or Lower Panels, 10 and 20, is forced past the Nub Spacers, 30, and through the Viscous Damping Holes, 60, of FIG. 2. Viscous damping converts displacement energy into heat.

Figure 3:
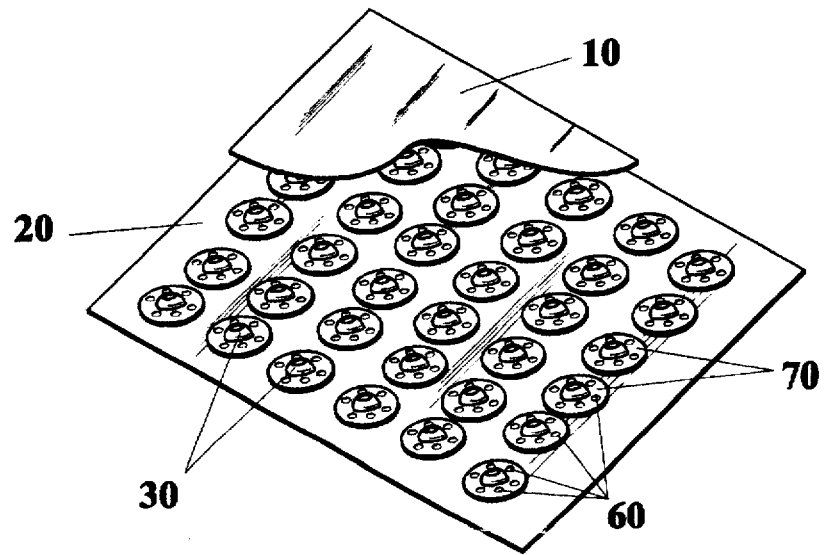
FIG. 3 shows an embodiment of the instant invention incorporating Nub Spacers with Extended Areas and Viscous Damping Holes.

FIG. 3 shows an embodiment of the instant invention incorporating Nub Spacers with Extended Areas and Viscous Damping Holes. In FIG. 3, Nub Spacers, 30, are individually placed between Upper Panel Section, 10, and Lower Panel Section, 20 and held firmly with adhesive or by fusion with Upper Panel Section, 10, and/or Lower Panel Section, 20. Nub Spacers, 30, serve to maintain a space between Upper Panel Section, 10, and Lower Panel Section, 20, and to transmit loading between panels. As a first approximation, propagating acoustic or vibrational energy presents to Nub Spacers, 30, as pressure variations that are multiplied in force magnitude by the ratio of the cross-sectional area of the Nub Spacers to the cross-sectional area of the panels. For example, if the Upper Panel Section, 10, and the Lower Panel Section, 20, each have a cross-sectional area of one square centimeter for each Nub Spacer, and the contact areas of each Nub Spacer is one square millimeter against each panel, then the ratio of the areas is 100:1. In this case, the amplitude of the force per square centimeter applied by propagating acoustic or vibrational energy to a panel will be multiplied by a factor of 100 at the Nub Spacer because there is $1/100^{th}$ the area to support it.

Increased pressure at the Nub Spacers will cause them to deform to a proportionally greater extent. The predominant modality of propagation across Nub Spacers will be in compression/tension. If the Nub Spacers are one millimeter from top to bottom and made from a common polymer such as Nylon, then the propagation delay through the Nub Spacers can be calculated. The speed of sound in Nylon 6,6 is roughly 2620 meters per second. The propagation delay through one millimeter is 382 nanoseconds. This short time period represents a negligible phase delay for all audible frequencies. The Nub Spacers are, therefore, effectively subjected to a uniform pressure throughout their length, from top to bottom, and will react to this stress by bulging or contracting radially in a direction perpendicular to the propagating direction of the acoustic or vibrational energy. In FIG. 3 Nub Spacers, 30, will re-direct some portion of the acoustic and vibrational energy propagating through them from Upper Panel Section 10, to Lower Panel Section, 20, into Extended Area, 70 by radial expansion and contraction. Once acoustic or vibrational energy is propagated onto Extended Areas, 70, it is unlikely to be redirected by Nub Spacers, 30, to either Upper Panel Section 10, or Lower Panel Section, 20, because the same compression/contraction mechanisms are only partially effective in the reverse direction. Furthermore, increasing the propagation distance by redirecting it to the Extended Areas, 70, increases the probability of effective dissipation as heat by the mechanisms discussed above; that is, by hysteresis effects, or enhanced phase cancellations, or by piezoelectric conversion into heat with conductive particles.

Viscous Damping may be exploited in addition to the mechanism of energy redirection discussed above. The propagation velocity of sound in most materials is much faster than the propagation velocity of sound in air of about 334 meters per second. In the structure shown in FIG. 3, the Extended Areas, 70, will be displaced by propagating acoustic energy much earlier than the surrounding air which is also propagating acoustic or vibrational energy from the same source, either the Upper or Lower Panel, 10 or 20, in FIG. 3. This phase difference in the propagation times of the structure of the spacer and the surrounding air forces the structure and the air to displace relative to each other. This relative displacement will cause viscous damping as the air between Upper or Lower Panels, 10 and 20, is forced past the Nub Spacers, 30, and through the Viscous Damping Holes, 60, in the Extended Areas, 70, of FIG. 3. Viscous damping converts displacement energy into heat.

Many modifications and variations of the present invention are possible in light of the above teachings. For example, the Filament Webbing shown in FIG. 1 could increase the number of filaments until it was a mat structure and more effective viscous damping and acoustic and vibrational propagation would result. The shape of the Extended Areas in FIG. 3 could be varied widely and the pattern of Viscous Damping Holes in both FIGS. 2 and 3 could be varied over a wide range of sizes and shapes with the same effect that is taught herein. Therefore, within the scope of the appended claims, the instant invention may be practiced otherwise than as specifically described herein.

I claim:

1. An acoustic and vibration damping spacer to hold apart and transmit loads between at least two surfaces comprised of:

a) a structure with at least two contact areas that contact and hold apart said surfaces, with the area of said contact areas being less than the area of said surfaces, so that pressure per unit of area applied to one of said surfaces is increased at said contact area substantially proportionate to the ratio of the areas of said surface and said contact area, and b) with said structure embodying an extended area substantially parallel to said surfaces, such that acoustic or vibrational energy propagating through said structure is substantially redirected into said extended area and such that said extended area interacts viscously with any gasses held between said surfaces.

2. The acoustic and vibration damping spacer of claim 1 with apertures in said extended area whereby viscous interactions with any gasses held between said surfaces are enhanced.

3. The acoustic and vibration damping spacer of claim 1 with said extended area comprised of a filament or a plurality of filaments.

4. The acoustic and vibration damping spacer of claim 1 with said extended area comprised of a regular or irregular polygon shape.

5. The acoustic and vibration damping spacer of claim 1 with said extended area of claim 1 comprised of an elliptical or circular shape.

6. An acoustic and vibration damping spacer to hold apart and transmit loads between at least two surfaces comprised of:
   a) a plurality of structures with at least two contact areas that contact and hold apart said surfaces with the area of said contact areas being less than the area of said surfaces, so that pressure per unit of area applied to one of said surfaces is increased at said contact area substantially proportionate to the ratio of the areas of said surface and said contact area, and
   b) with said plurality of structures embodying an extended area substantially parallel to said surfaces that interconnects said plurality of structures such that acoustic or vibrational energy propagating through said plurality of structures is substantially redirected into said extended area and such that said extended area interacts viscously with any gasses held between said surfaces.

7. The acoustic and vibration damping spacer of claim 6 with apertures in said extended area whereby viscous interactions with any gasses held between said surfaces are enhanced.

8. The acoustic and vibration damping spacer of claim 6 with said extended area comprised of a filament or a plurality of filaments.

9. The acoustic and vibration damping panel spacer of claim 6 with said extended area comprised of a sheet of material.

* * * * *